United States Patent [19]

Von Der Osten-Sacken et al.

[11] Patent Number: 5,666,858
[45] Date of Patent: Sep. 16, 1997

[54] TWIST GRIP FOR ACTUATING GEARS OF A PEDAL CYCLE

[75] Inventors: Ernst Von Der Osten-Sacken, Roetgen; Arne Heymer, Erftstadt, both of Germany

[73] Assignee: Hans Helmig GmbH, Overath, Germany

[21] Appl. No.: 460,726

[22] Filed: Jun. 2, 1995

[30] Foreign Application Priority Data

Jun. 10, 1994 [DE] Germany .................. 44 20 273.3

[51] Int. Cl.$^6$ .................. G05G 11/00; F16C 1/10
[52] U.S. Cl. .................. 74/489; 74/506
[58] Field of Search .................. 74/489, 506, 551.9

[56] References Cited

U.S. PATENT DOCUMENTS

| | | | |
|---|---|---|---|
| 635,084 | 10/1899 | Taylor | 74/551.9 |
| 2,874,587 | 2/1959 | Schmid | 74/489 |
| 4,840,081 | 6/1989 | Nagano | 74/506 X |
| 5,134,897 | 8/1992 | Romano | 74/506 X |
| 5,241,877 | 9/1993 | Chen | 74/506 X |

FOREIGN PATENT DOCUMENTS

| | | | |
|---|---|---|---|
| 571631 | 12/1993 | European Pat. Off. | 74/489 |
| 349765 | 6/1931 | United Kingdom . | |

*Primary Examiner*—Charles A. Marmor
*Assistant Examiner*—Mary Ann Battista
*Attorney, Agent, or Firm*—Charles L. Schwab

[57] ABSTRACT

In a twist selector grip for selecting pedal cycle gear ratios, the rotary movement of the grip (3) is converted to a longitudinal movement of a tension member (2). The tension member (2) is fastened to the grip (3) and wound, similar to a screw thread, about the pedal cycle handlebar (1) or a sleeve (4) enclosing it. The tension member (2) is guided in a longitudinal guide (5) fixed in position relative to the pedal cycle handlebar (1) at a relatively great distance, in the direction of the rotation axis of the grip (3), from the fastening point (6) of the tension means (2) to the grip (3). By this construction, the arcuate distance the fastening point (6) travels, upon rotation of the grip (3), is significantly greater than the travel of the tension means (2) in its longitudinal guide (5), whereby a favorable conversion of large rotational movements of the grip (3) into small longitudinal movements of the tension means (2) is achieved. The grip (3) is releasably retained in its speed ratio selecting positions by a spring biased detent having an adjustable retaining force.

7 Claims, 3 Drawing Sheets

TWIST GRIP FOR ACTUATING GEARS OF A PEDAL CYCLE

TECHNICAL FIELD

This invention relates to a selector device having a rotatable grip for actuating gears of a pedal cycle.

BACKGROUND OF THE INVENTION

In previously designed twist selector grips intended for mounting on pedal cycle handlebars, in which the selector grip pulls on a tension means against a spring installed in the gear mechanism, two principles are used.

In one prior design, shown in European patent document EP 0 423 779 A1, a cable is wound without slippage on a spool slid over the pedal cycle handlebar. By using the pedal cycle handlebar, however, a minimum diameter, and thus a minimum circumference of the spool, is determined. Because the cable is wound on this circumference, relatively great longitudinal movements of the cable occur as a result of even small rotary movements of the spool, which works against the desire for precise selection.

In another prior design, such as shown in U.S. Pat. No. 5,102,372 and European patent document EP 0 575 560 A1, a cable fastened to a non-rotatable part of the selector grip is laid in a loop around a rotatable cam. By turning this cam, the cable loop is expanded and a relatively slight linear movement is achieved through rather large rotary movements. This solution has the disadvantage of the large wrap angle of the cable around the cam, which brings about relatively high friction between the cam and the cable.

OBJECTS AND SUMMARY OF THE INVENTION

A primary object of the invention is to achieve a relatively slight longitudinal movement on a tension member, for example a cable, in the simplest possible manner by means of rotary movement of a grip about a pedal cycle handlebar, and in so doing to avoid high friction forces. Upon rotation of the grip, the tension member, between the outlet opening of the longitudinal guide and the point at which the tension member is attached to the grip, can position itself freely, in response to the forces acting on it. The longitudinal guide is preferably fastened to an annular body, which is fixedly secured to, or an integral part of, the pedal cycle handlebar, for example by means of a radial screw. The twist grip axially abuts an annular shoulder on the annular body to which the longitudinal guide is fastened, because the spring biased tension member exerts an axial force component on the grip. According to the basic idea of the invention, the tension means can move freely on the pedal cycle handlebar or a sleeve enclosing the handlebar and can take up a direction in accordance with the applied force. The sleeve can be fastened to the annular body on which the longitudinal guide is arranged, or can be made in one piece with the guide. It can also be arranged on the pedal cycle handlebar as a separate component. Finally, however, it can also be made in one piece with the grip or fastened to the grip. It is advantageous if the sleeve has the smoothest possible surface so that only slight friction forces arise between the tension member and the sleeve. Depending on whether a sleeve is provided and how the sleeve is designed, the twist grip can be supported radially on the pedal cycle handlebar and, if appropriate, on a continuation of the annular part to which the longitudinal guide is fastened. The grip can, however, also be supported on the cylindrical surface of the sleeve, a recess being provided in the region in which the tension member moves on the sleeve, which recess insures the freedom of movement of the tension member, and also provides an axial abutment for the grip. Even if the sleeve is fastened to the grip, a corresponding recess can be provided, which recess, however, is then adapted in its form to the different kinematics.

BRIEF DESCRIPTION OF THE DRAWINGS

For a further explanation of the invention, reference is made to the drawings, in which.

DETAILED DESCRIPTION OF THE DRAWINGS

Figure 1:
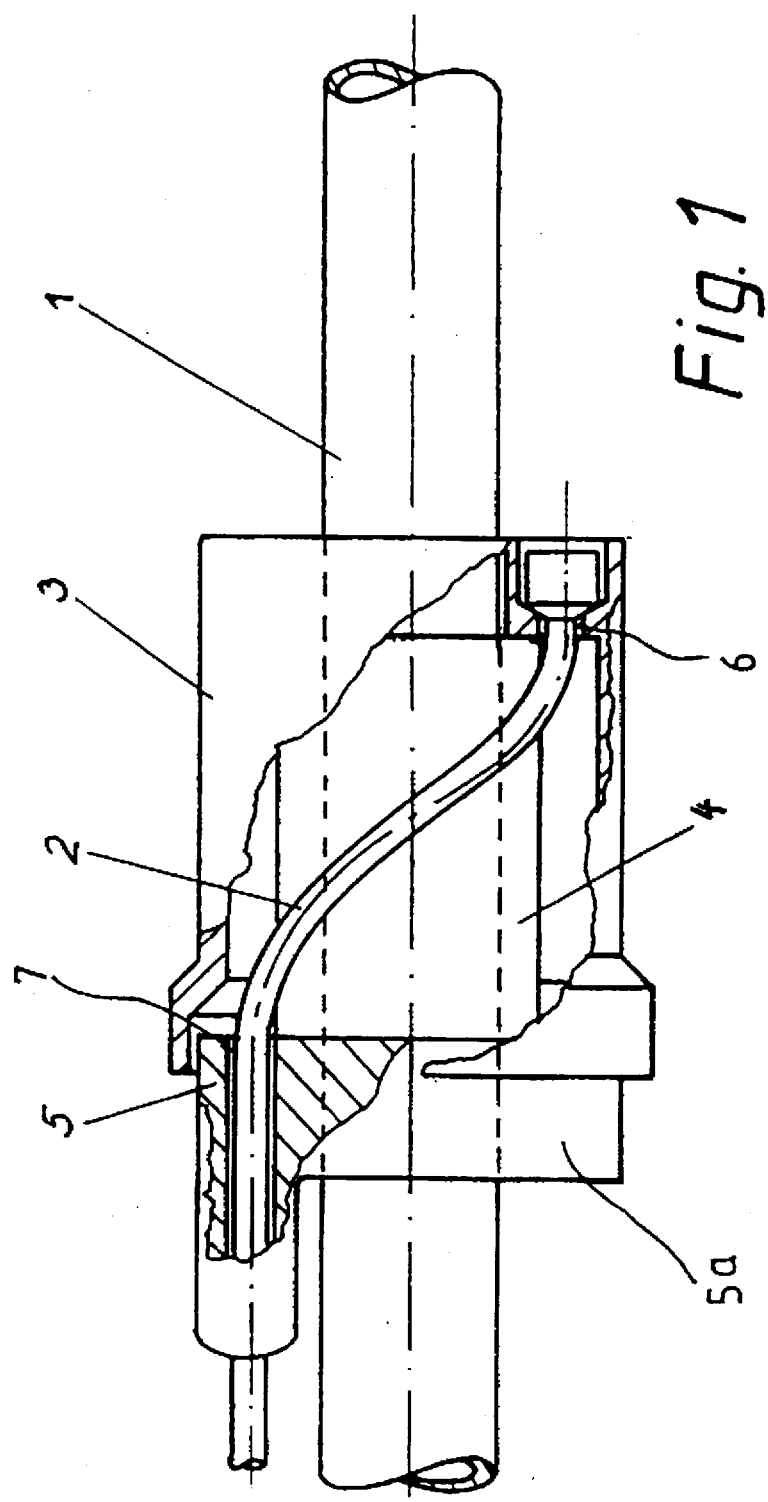
FIG. 1 is a lateral view of a twist grip with parts broken away to show the longitudinal guide and the annular body.
Figure 2:
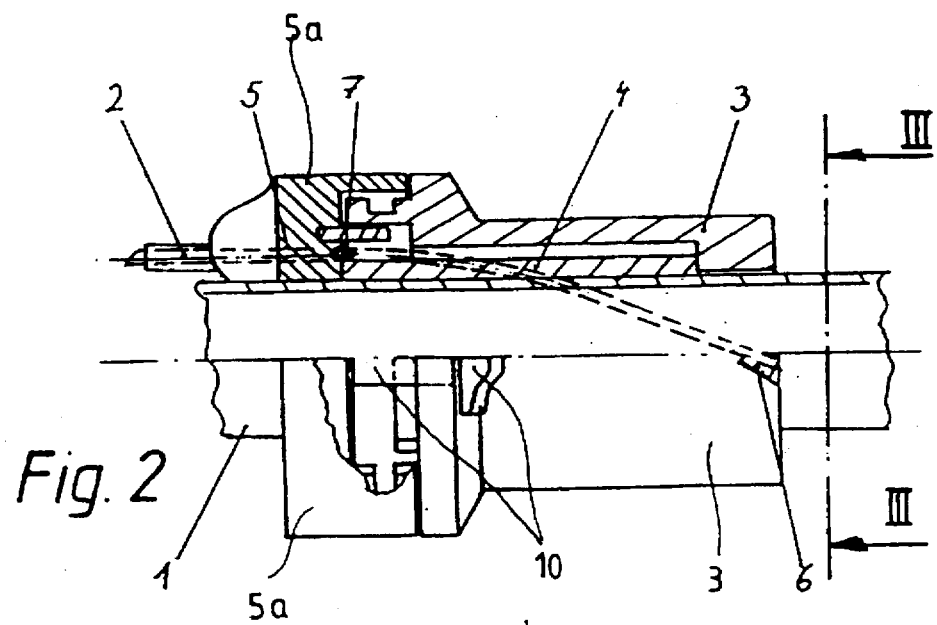
FIG. 2 is a side view of a twist grip of this invention with the upper half showing a longitudinal section and with parts of the annular body broken away in the lower half.

In FIGS. 1 to 5, insofar as shown individually, the number 2 denotes a tension member or cable which is fastened to a grip 3 rotatably mounted on the pedal cycle handlebar 1 for rotation about the axis of that part of the handle bar on which it is mounted. The tension member 2 is deflected or wound, similar to a screw thread, around the outer cylindrical surface of a sleeve 4 encircling the pedal cycle handlebar 1 and is guided by means of a longitudinally extending guideway or guide 5, which is formed in an annular body 5a which is fixed to the pedal cycle handlebar 1. Upon rotation of the grip 3, the notch or fastening point 6, at which the tension member 2 is secured to the grip 3, is moved in a circular path about the handlebar 1, and by this movement the tension member 2 is moved longitudinally in its longitudinal guide 5. By selecting a sufficiently large distance in the direction of the rotation axis of the grip 3 between the circular path of the fastening point 6 and the outlet opening 7 for the tension member 2, the travel distance that the fastening point 6 moves in its circular path is significantly longer than the travel distance of the tension member 2 out of the opening 7 of the longitudinal guide 5. When the grip 3 is rotated, the fastening point 6 for the tension member 2 moves in circular path lying in a plane perpendicular to the rotational axis of the grip and the tension member 2 spirals about the sleeve 4. In FIG. 1 the grip has been rotated 180 degrees from a position in which the tension member 2 was in a straight line configuration parallel to the cylindrical surface of the sleeve 4. Since the fastening point 6 does not move in an axial direction away from the opening 7 in the guide 5 but instead moves in an arcuate path transverse to the initial position of the tension member, the distance the tension member is withdrawn from the opening is not as great a distance as the length of the arcuate path of the fastening point. The tension member does not make a right angle turn when the grip is rotated but instead slides to a spiral position. The distance between the fastening point 6 and the outlet opening along the rotation axis is preferably 50 mm. Also significant for the conversion of the rotary motion of the grip to a push-pull motion on the tension member 2 is the diameter of the sleeve 4 or of the pedal cycle handlebar 1. The sleeve 4 preferably has a diameter of 25 mm.

The ratio of these travel distances depends on, among other factors, the range of the rotation angle used. At the beginning of actuation of the twist grip (when the tension member 2 is at the beginning of the pull motion), if the fastening point 6 of the tension member 2 is initially on a line parallel to the rotation axis of the grip 3 through the outlet opening 7 ($\alpha 0=0°$), then only an extremely small longitudinal movement of the tension member 2 takes place upon initial rotation of the grip 3. If, however, an angle $\alpha 0$ markedly greater than 0° is selected for the beginning of the gear selecting actuation, that is, the fastening point 6 is already rotated at the beginning of actuating rotation of the twist grip, then a greater longitudinal movement of the tension member 2 takes place at the beginning of the cable actuating rotation, and the linearity of the conversion of the rotary movement of the grip 3 to the longitudinal movement of the tension member 2 is better. The desired conversion occurs if, at the beginning of actuation of the selector grip 3, the fastening point 6 of the tension member 2 is already rotated about the rotation axis of the grip 3 by an angle about equal to 104 degrees ($\alpha 0°\sim 104°$) in the actuation direction relative to alignment with the outlet opening 7. By rotating the grip 3 approximately 135° until $\alpha max=239°$ is reached, the desired length of the tension member 2 is drawn into the grip to actuate the various gears of the pedal cycle.

The oblique direction of the guide or passageway 5 and its cable outlet opening 7 is selected such that it coincides with the direction of the tension member or cable 2 immediately outside the longitudinal guide 5 when the grip 3 is rotated to a middle position of rotation, $\alpha m=(\alpha 0+\alpha max)/2$. With this positioning of the guide 5 and outlet opening 7, a minimum deflection of the tension member 2 occurs in operating the grip 3 throughout its rotation range.

Figure 5:
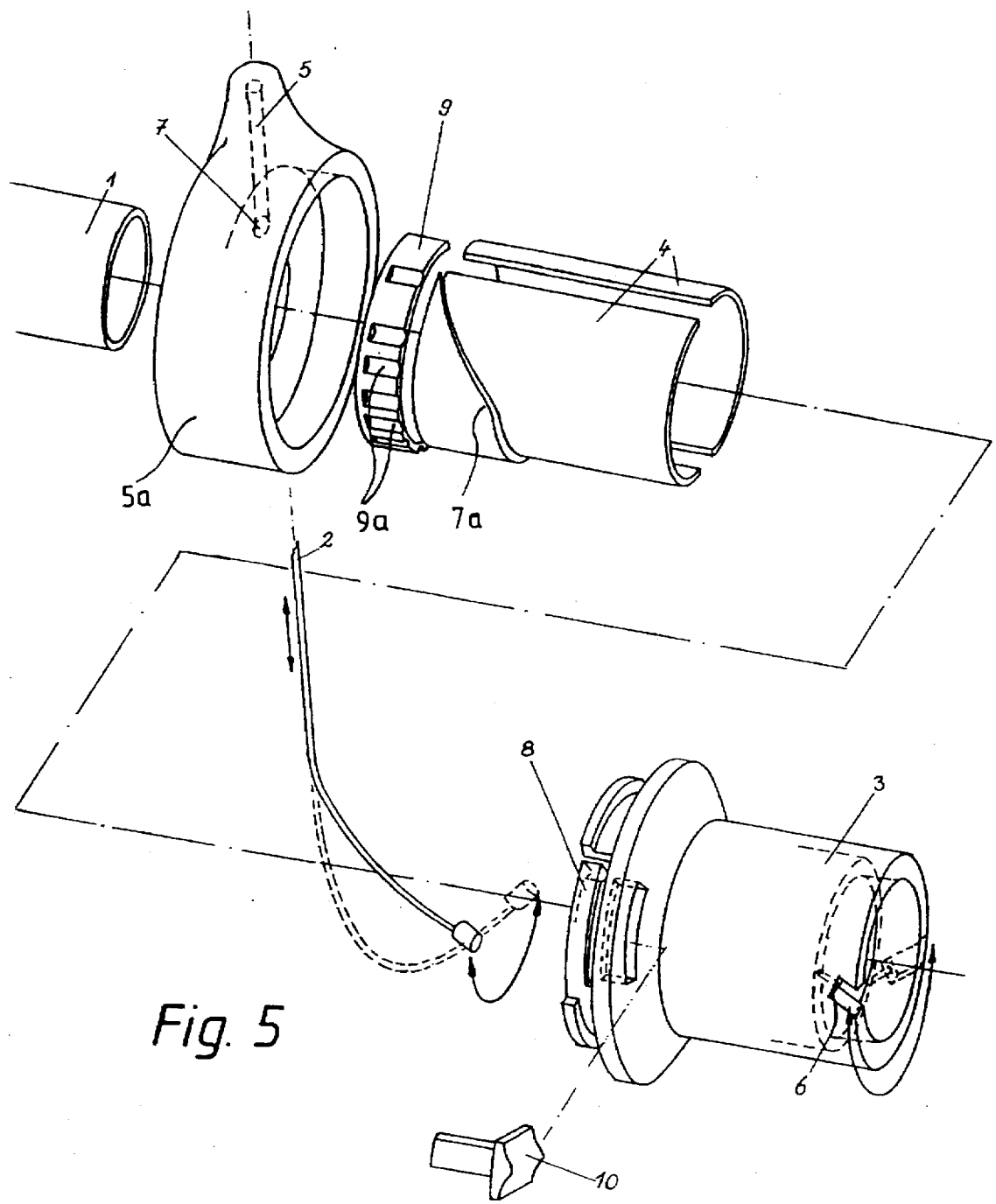
FIG. 5 is an exploded view of the twist grip shown in FIG. 2.

The conversion of rotary to longitudinal movement is varied if the position of the tension member 2 between the outlet opening 7 of the longitudinal guide 5 and the fastening point 6 of the grip 3 is guided by a shoulder 7a against which the tension member 2 at least partially lies. To this end, both elements that co-rotate with the grip 3 and those that are fixed in position relative to the handlebar 1 can be used. In FIG. 5, the shoulder or guide element 7a is shown integrally formed on the sleeve 4. The sleeve 4 in this case is fixed against rotation by being fastened to the annular body 5a.

Figure 3:
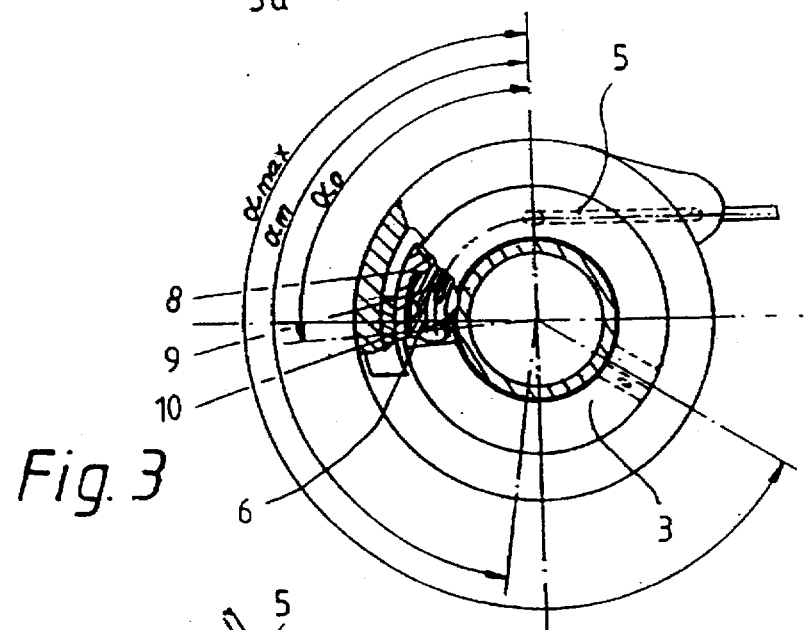
FIG. 3 is a view taken along the line III—III in FIG. 2 with partial sections through the annular body, the detent spring, the detent segment, the stop and the grip.
Figure 4:
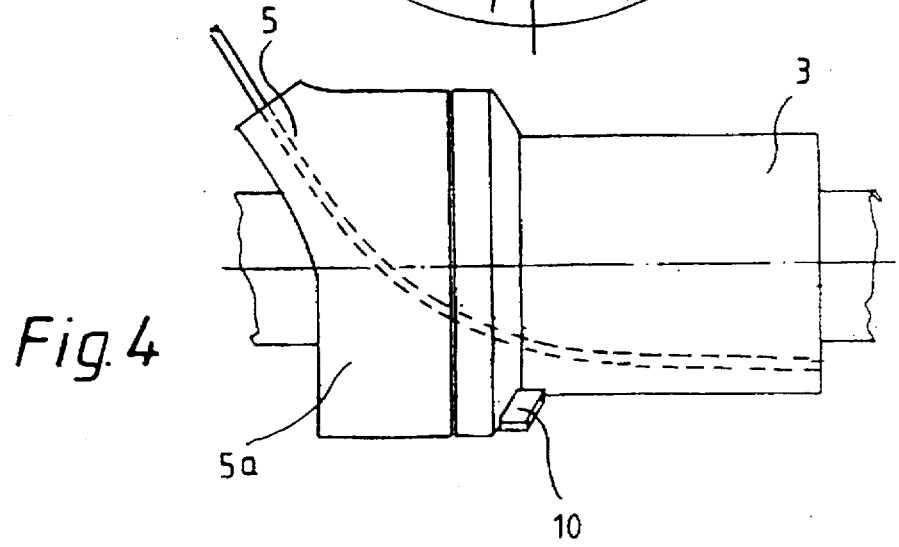
FIG. 4 is a top view of the twist grip shown in FIG. 2.

The twist grip 3 is releasably retained in the appropriate position for each step of the gear by a detent. For this purpose, a detent segment 9 is provided (FIGS. 3 and 5), which is attached to the annular body 5a. The retaining force of the detent and the actuation force required to overcome the detent is adjustable by virtue of the fact that a detent pawl 8 includes a detent spring shaped as a curved leaf spring. An adjustable stop 10 limits the range in which the leaf spring can bend freely (FIGS. 3 and 5). By shifting the stop 10, the freely springing range of the detent spring or pawl 8 and thus its retaining force is varied. The detent pawl 8 is fixed to the grip 3 in the rotation direction and is arranged so that the stop 10, which is also guided in the grip 3, is readily accessible for actuation. The stop an, however, also be fastened to a ring and supported on the grip 3. The ring can have small recesses on its outer surface, by which it can easily be adjusted.

Detent surfaces or detent notches 9a are formed in the detent 9 which is made as a replaceable and interchangeable part so that, by simply exchanging this component, different detents can be installed. In this way, injection-molded parts, identical up to the detent segment 9 with the detent surfaces, can be used for grips for the front derailleur of the gear and grips for the rear derailleur of the gear.

By splitting some components that cannot be slid onto curved handlebars because of their dimensions, for example the sleeve 4 (FIG. 5), mounting of the twist grips on curved handlebars is also enabled. Further advantages of this solution lie in the small wrap angle required of the tension member 2 about the handlebar 1 or the sleeve 4 and the associated low friction. Also, since the tension member 2 is curved to a larger radius, it is bent less severely, than in other solutions.

What is claimed is:

1. A selector device mounted on the handle bar (1) of a pedal cycle which actuates gears of the pedal cycle to select a predetermined number of speed ratios by converting rotary movement to longitudinal movement of a tension member (2) against a resilient biasing force, said device comprising:

a rotatable grip (3) adapted for rotational mounting on said handle bar (1) for rotary movement through a predetermined operating angle to select said predetermined number of speed ratios, a longitudinal guide (5) rigidly securable to said handle bar (1) in axially abutting relation to said rotatable grip (3) and presenting an outlet opening (7) in axially confronting relation to said rotatable grip (3), a sleeve (4) coaxially positioned within said rotatable grip (3) and having an outer cylindrical surface, said tension member (2) extending through said longitudinal guide (5) and said outlet opening (7) and along said outer cylindrical surface of said sleeve (4) to an attachment point (6) at a point on said rotatable grip (3) remote from said outlet opening (7), upon rotary actuation of said rotatable grip (3), said attachment point (6) of said tension member (2) to said rotatable grip (3) moves in a circular path coaxial with the rotational axis of said rotatable grip (3) thereby causing said tension member (2), between said outlet opening (7) of said longitudinal guide (5) and said attachment point (6), to be wrapped about said sleeve (4) and a detent including
a detent pawl (8),
a detent segment (9) having a detent notch for each of said predetermined number of speed ratios,
a leaf spring biasing said detent segment (9) and
a movable stop (10) abutting an intermediate part of said leaf spring for varying the biasing effect of said leaf spring on said detent segment (9), said detent being operatively associated with said longitudinal guide (5) and said rotatable grip (3) whereby said detent segment (9) releasably retains said rotatable grip (3) in each of its rotated positions at which one of said predetermined number of speed ratios is selected.

2. The selector device of claim 1 wherein at the beginning of said rotary actuation of said rotatable grip (3), when said tension member (2) is at the beginning of its pull motion, said attachment point (6) is in a rotatively displaced position in the direction of actuation of said rotatable grip (3) from an aligned position in which said attachment point (6) is substantially on a line through said outlet opening (7) and parallel to said rotation axis of said rotatable grip (3).

3. The selector device of claim 2 wherein at the beginning of said rotary actuation of said rotatable grip (3), said rotatively displaced position is approximately 104° in the actuation direction about the rotation axis of said rotatable grip (3) and wherein said rotatable grip (3) is rotatably in the actuation direction through said operating angle approximately 135° from said rotatively displaced position during rotative operation of said rotatable grip (3) to select said predetermined number of speed ratios.

4. The selector device of claim 3 wherein said longitudinal guide (5) and said outlet opening (7) extend in an oblique direction relative to said axis of rotation of said rotatable grip (3) to substantially coincide with a direction in which said tension member extends from said outlet opening when said rotatable grip (3) is rotated through one half of said operating angle.

5. The selector device of claim 1 wherein said longitudinal guide (5) and said outlet opening (7) are in general alignment with said tension member (2) when said rotatable grip (3) is rotated through one half of said operating angle.

6. The selector device of claim 1 and further comprising a shoulder (7a) formed on an intermediate part of said outer cylindrical surface of said sleeve (4), said tension member (2) bearing against said shoulder when said rotatable grip (3) is rotated through said operating angle thereby varying the ratio between the roative movement of said attachment point (6) and the resulting longitudinal movement of said tension member (2) as said rotatable grip (3) is rotated through said predetermined operating angle.

7. The selector device of claim 1 wherein said detent segment (9) is a replaceable part which is interchangeable with corresponding parts of selector devices for pedal cycles having different numbers of speed ratios.

* * * * *